(12) United States Patent
Ramseyer

(10) Patent No.: US 10,182,180 B2
(45) Date of Patent: Jan. 15, 2019

(54) MULTIPLE CAMERA CONTROL SYSTEM

(71) Applicant: Peau Productions, Inc., San Diego, CA (US)

(72) Inventor: Nolan Ramseyer, San Diego, CA (US)

(73) Assignee: Peau Productions, Inc., San Diego, CA (US)

( * ) Notice: Subject to any disclaimer, the term of this patent is extended or adjusted under 35 U.S.C. 154(b) by 0 days.

(21) Appl. No.: 15/292,996

(22) Filed: Oct. 13, 2016

(65) Prior Publication Data

US 2018/0070003 A1 Mar. 8, 2018

Related U.S. Application Data

(60) Provisional application No. 62/384,611, filed on Sep. 7, 2016.

(51) Int. Cl.
| | |
|---|---|
| *H04N 5/225* | (2006.01) |
| *H04N 5/247* | (2006.01) |
| *H04N 5/232* | (2006.01) |
| *H04N 7/18* | (2006.01) |

(52) U.S. Cl.
CPC ......... *H04N 5/2252* (2013.01); *H04N 5/2253* (2013.01); *H04N 5/2254* (2013.01); *H04N 5/2257* (2013.01); *H04N 5/2258* (2013.01); *H04N 5/23206* (2013.01); *H04N 5/23241* (2013.01); *H04N 5/247* (2013.01); *H04N 7/185* (2013.01); *H04N 7/188* (2013.01)

(58) Field of Classification Search
CPC .. H04N 5/23209; H04N 5/247; H04N 5/2253; H04N 5/2252; H04N 5/335; H04N 5/2254; H04N 5/2353; H04N 7/188; H04N 7/10
See application file for complete search history.

(56) References Cited

U.S. PATENT DOCUMENTS

| | | | |
|---|---|---|---|
| 5,164,827 A | 11/1992 | Paff | |
| 5,734,929 A * | 3/1998 | Brogden | ................ G03B 17/04 396/201 |
| 6,864,911 B1 * | 3/2005 | Zhang | .................... G03B 35/08 348/42 |
| 7,512,261 B2 | 3/2009 | Lou et al. | |
| 7,733,371 B1 * | 6/2010 | Monroe | ........... G08B 13/19628 348/143 |

(Continued)

*Primary Examiner* — Chia-Wei A Chen
*Assistant Examiner* — John H Morehead, III
(74) *Attorney, Agent, or Firm* — Stetina Brunda Garred & Brucker

(57) ABSTRACT

An image capture system controlled by a trigger source includes one or more imaging devices, each including a lens with an optical filter attachable thereto in axial alignment with an optical axis of the lens, a sensor, a link board interface, and a controller in communication with the sensor and connected to the link board interface. One or more imaging array link boards each includes a plurality of imaging device interfaces and a first link board interconnect. The link board interface is connected to the imaging device interface. The first link board interconnect is connectible to a link board interconnect of another imaging array link board. A shutter activation command from the trigger source is transmitted to the imaging devices to initiate an image capture procedure thereby.

21 Claims, 13 Drawing Sheets

(56) References Cited

U.S. PATENT DOCUMENTS

| | | |
|---|---|---|
| 7,843,487 B2 * | 11/2010 | Tojima .................. H04N 5/232 |
| | | 348/159 |
| 8,564,671 B2 | 10/2013 | Odawara |
| 8,704,903 B2 | 4/2014 | McClellan |
| 8,988,509 B1 | 3/2015 | MacMillan et al. |
| 9,196,039 B2 | 11/2015 | MacMillan et al. |
| 9,197,885 B2 | 11/2015 | Sun et al. |
| 2003/0090582 A1 * | 5/2003 | Shimokawa ......... H04N 5/2353 |
| | | 348/297 |
| 2005/0207487 A1 | 9/2005 | Monroe |
| 2006/0056056 A1 * | 3/2006 | Ahiska ............. G08B 13/19608 |
| | | 359/690 |
| 2011/0310219 A1 | 12/2011 | Kim et al. |
| 2015/0348580 A1 | 12/2015 | van Hoff et al. |

\* cited by examiner

MULTIPLE CAMERA CONTROL SYSTEM

CROSS-REFERENCE TO RELATED APPLICATIONS

This application relates to and claims the benefit of U.S. Provisional Application No. 62/384,611 filed Sep. 7, 2016 and entitled "MULTIPLE CAMERA CONTROL SYSTEM," the disclosure of which is wholly incorporated by reference in its entirety herein.

STATEMENT RE: FEDERALLY SPONSORED RESEARCH/DEVELOPMENT

Not Applicable

BACKGROUND

1. Technical Field

The present disclosure relates generally to image capture, and more particularly to digital imaging systems in which multiple self-contained camera modules are controlled, and link board hardware therefor.

2. Related Art

Image capture is fundamentally the focusing of a specific amount of light from a scene for a specific duration on to a photosensitive element of a specific sensitivity. Although having its origins in chemical-based processes using light-sensitive film, most conventional image capture systems are digital, with film being replaced with a sensor that converts photons of light into electronic signals. An optical lens focuses the light onto the sensor, with the focal length of the lens determining the width of the scene that is recorded. An adjustable aperture within the lens sets the amount of light that is passed to the sensor, while a shutter is opened for an adjustable, predetermined duration in which the sensor is exposed to the light passing through the lens. The shutter may be a mechanical device that physically blocks light from being passed to the sensor, though it may also be implemented electronically by activating the sensor only for the specified duration.

The electronic signals corresponding to the different wavelengths and intensities of light captured by the sensor are then converted to digital data via an analog-to-digital converter (ADC). The total exposure, which is defined as a combination of intensity and duration, that is needed for a proper image also depends upon the sensitivity or speed of the sensor, which can be variably set. The data is then stored on an on-board memory device such as flash memory. The foregoing operational principle is applicable to both static images as well as video, which is an extension to multiple images that are time-sequenced.

The components utilized to implement this basic image capture functionality, e.g., the lens, sensor, and controller/data processor, are well known and are available in a wide range of sizes and configurations that may be readily adapted to different platforms such as mobile communications devices, system cameras, as well as aerial vehicles to obtain footage of otherwise inaccessible locations. Depending on the needed field of view and resolution, as well as the anticipated lighting conditions of the scene to be captured, different lens and sensors may be utilized. Furthermore, the sensitivity range of imaging sensors are not limited to visual wavelengths, and there are infrared, ultraviolet, and x-ray sensors that can be used for diagnostic applications as well as for artistic effect. Although quality is constantly being improved, component size/weight and resultant image quality are oftentimes inversely related, with an emphasis towards one being a compromise with respect to the other. For example, higher resolution images are possible with larger sensors, while more compact sensors tend to be noisier. Moreover, lenses of maximum aperture and highest quality (maximum contrast and resolution, minimal aberrations across the entire diameter) are typically larger and heavier.

A typical system camera is comprised of a body incorporating the sensor and various control inputs such as the shutter button, shutter speed adjustments, and sensor sensitivity adjustments, along with one more interchangeable lenses of differing focal lengths and maximum aperture. Different lens focal lengths capture a scene aesthetically differently, so in order to provide the photographer a palette options that can be selected as desired, lenses for system cameras are offered in multiple focal lengths. Zoom lenses in which the focal length is variable may also be available. Whether fixed or variable focal length, the lenses typically include control inputs for adjusting aperture and focus, and in the case of zoom lenses, control inputs for adjusting focal length/zoom level.

Although some photographers rely on more than one body each equipped with different lenses during a photographic assignment, the components of the body, including the sensor, are not intended to be interchangeable from one shoot to the next. Further, because the photographer has immediate access to the camera body and to the lenses during operation, the hardware implementation thereof is more generalized, with an extensive variety of configuration settings and functionalities being definable and accessible via a software-implemented user interface.

With imaging systems that are incorporated into unmanned aircraft and other remotely controlled vehicles, however, there are substantial size and weight constrains due to the limited power plant and power source in typical configurations. Accordingly, the cameras are typically smaller and have more specifically defined or limited functionality that is selected for a given aerial photography/videography assignment. In one flight, the vehicle may be equipped with one sensor/lens/lens filter combination that is ideal for one subject and lighting condition (e.g., sunset landscape shots for which a faster, extreme wide angle lens with a polarizing filter is appropriate). In a different flight, the same vehicle may be equipped with a different sensor/lens/lens filter combination that is ideal for a different subject and lighting condition (e.g., daytime footage of a house for a real estate advertisement for which a conventional, standard focal length lens with minimal distortion is appropriate).

An aerial vehicle combined with an imaging system may serve a variety of duties beyond the aforementioned aerial photography, including agricultural, environmental, wildlife, and other surveys of land, inspection of power lines and other structures that are difficult to access and observe, search and rescue, and so on. These assignments may call for more than one camera, and so there is a need in the art for an imaging system in which multiple cameras can be controlled as a single unit. Furthermore, there is a need for individual camera units with such different capabilities to be readily added and subtracted to the system as dictated by particular needs without limiting flight time by carrying unneeded camera units.

BRIEF SUMMARY

Various embodiments of the present disclosure are directed to an array camera linking system to operate multiple cameras simultaneously. Different cameras can be added and removed as desired to meet the specific application needs.

One embodiment is an image capture system controlled by a trigger source. The image capture system may include one or more imaging devices. Each imaging device may include a lens with an optical filter attachable thereto in axial alignment with an optical axis of the lens, a sensor, a link board interface, and a controller in communication with the sensor and connected to the link board interface. Furthermore, there may be one or more imaging array link boards each including a plurality of imaging device interfaces and a first link board interconnect. The link board interface of a first one of the one or more imaging devices may be connected to a first one of the plurality of imaging device interfaces of a first one of the one or more imaging array link boards. The first link board interconnect of the first one of the one or more imaging array link boards may be connectible to a link board interconnect of another imaging array link board. The system may further include a trigger source interface that is connected to and in communication with the trigger source. Additionally, the trigger source interface may be connected to the first one of the one or more imaging array link boards. A shutter activation command from the trigger source may be transmitted to the first one of the one or more imaging devices to initiate an image capture procedure thereby.

According to another embodiment of the present disclosure, there may be an array imaging system expander. The expander may include a connector board assembly defined by first and second side ends, a front face, and an opposed rear face. There may also be a first board interconnect disposed on the first side end of the connector board assembly. The first board interconnect may be connectible to a corresponding board interconnect of a first different array imaging system connector. There may also be a first imaging device interface extending from the front face of the connector board assembly, as well as second imaging device interface extending from the rear face of the connector board assembly opposite the first imaging device interface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a multiple camera control system. This description is not intended to represent the only form in which the system may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, primary and secondary, and the like are used solely to distinguish one from another entity without necessarily requiring or implying any actual such relationship or order between such entities.

Figure 1:
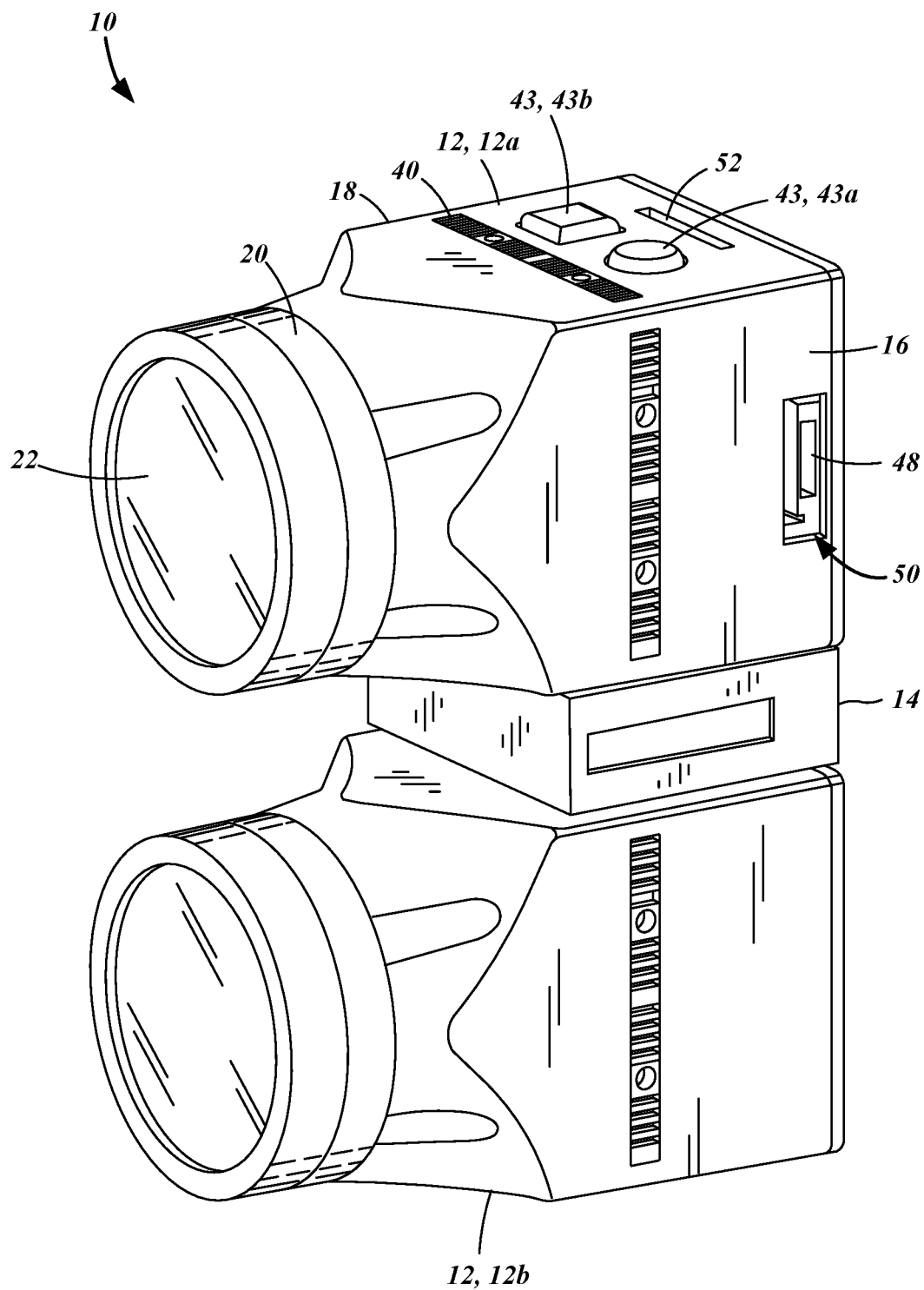
FIG. 1 is a front perspective view of an image capture system in accordance with one embodiment of the present disclosure including a pair of cameras and a single link board.
Figure 2:
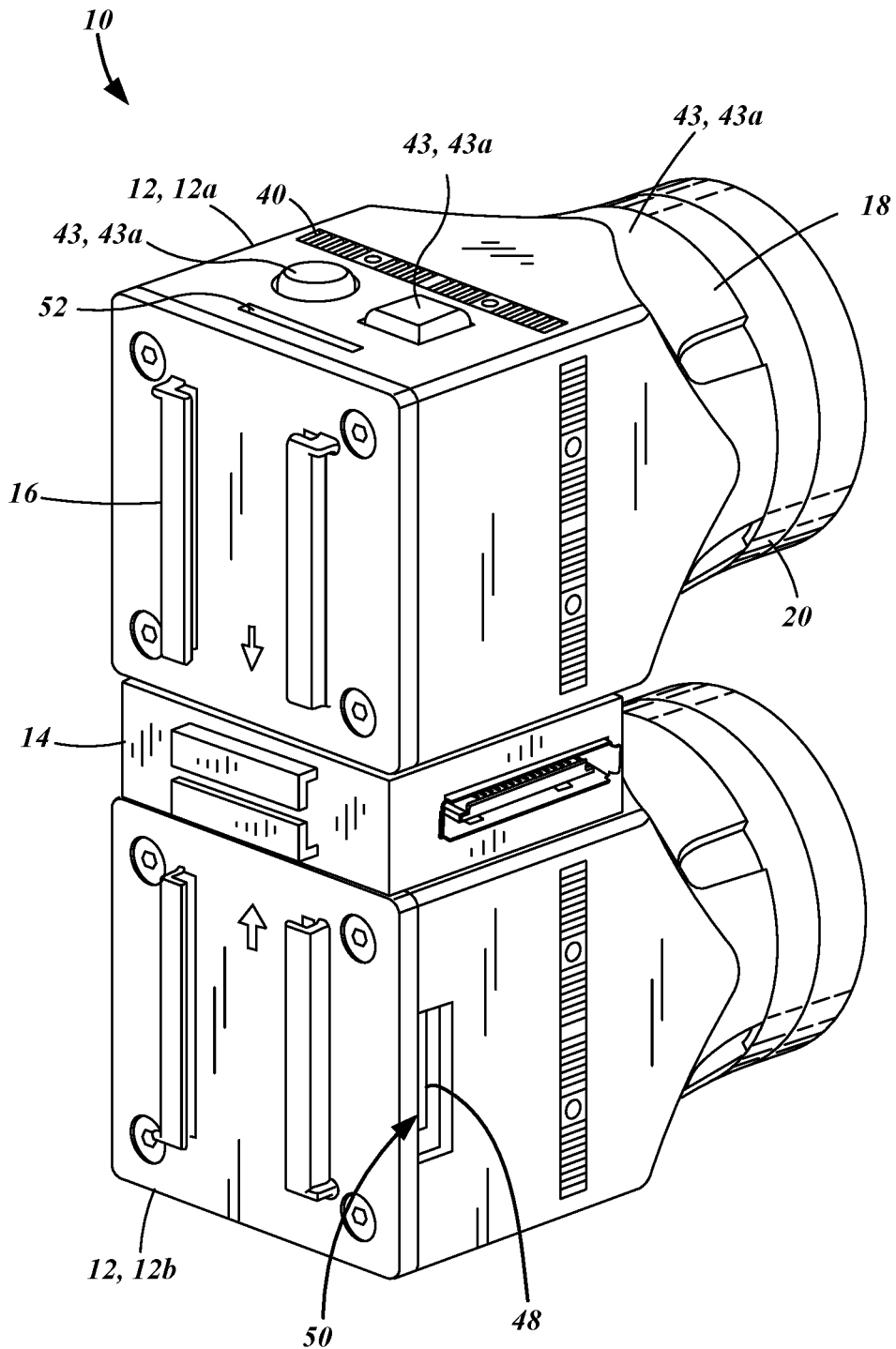
FIG. 2 is a rear perspective view of the image capture system shown in FIG. 1.
Figure 3:
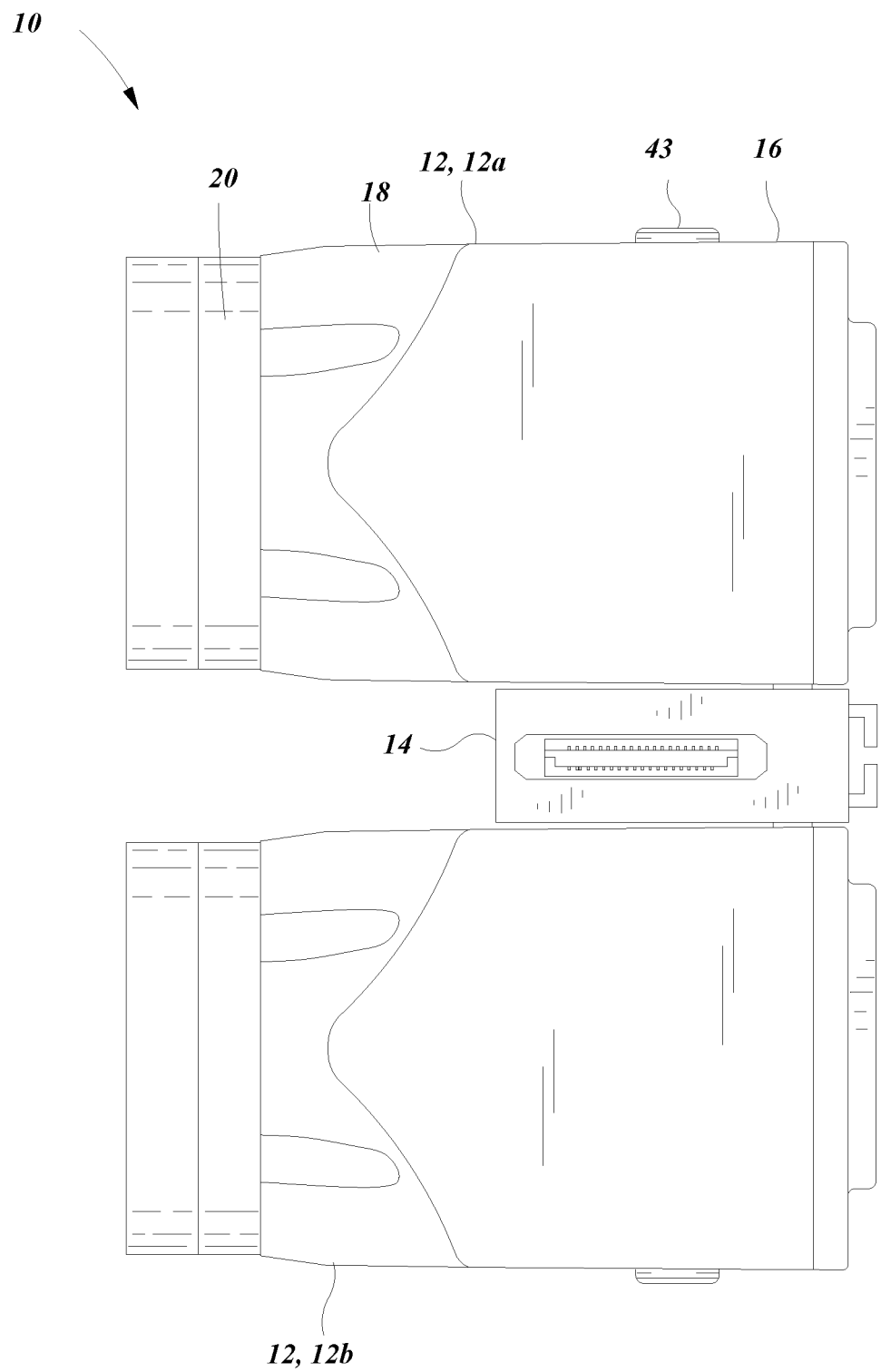
FIG. 3 is a right side plan view of the image capture system shown in FIGS. 1 and 2.

Referring to FIGS. 1, 2, and 3, one embodiment of an image capture system 10 contemplates a plurality of imaging devices 12, e.g., cameras, that are linked together to operate in unison. In accordance with various embodiments, the imaging devices 12 are electrically and mechanically connected to an imaging array link board 14, the details of which will be described more fully below. In the basic embodiment illustrated in FIGS. 1-3, there is a first imaging device 12a that is designated and functions as a primary/master camera, and a second imaging device 12b that is designated and functions as a secondary/slave camera.

Figure 4:
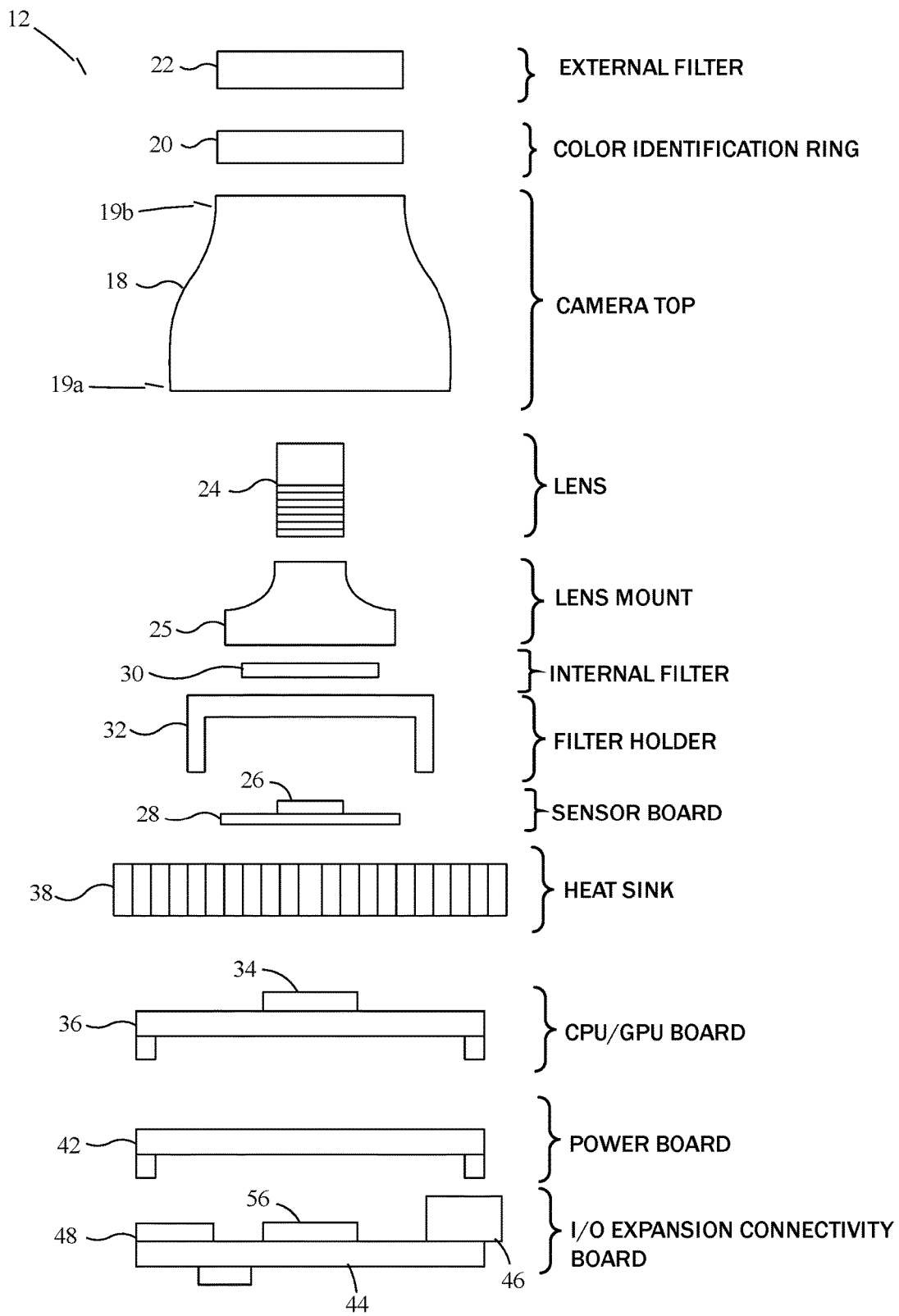
FIG. 4 is an exploded view of an exemplary camera that may be utilized in the embodiments of the image capture system.

Each of the imaging devices 12 is understood to be a standalone unit that includes a lens, filters, and a sensor enclosed within a camera housing 16. With additional reference to the exploded side view of the imaging device 12 in FIG. 4, the camera housing 16 is engaged to a camera top 18 defined by a base end 19a and an opposed front end 19b. The camera housing 16 is sized and configured to complement the lens that is installed in the imaging device 12. However, the camera housing 16 is optional and not required in certain embodiments of the image capture system 10.

Attached to the front end 18b of the camera top 18 is a color identification ring 20. Various colors of the identification are contemplated, so that individual imaging devices 12 according to the type of lens, internal filter, sensor, processing board, etc. and combinations thereof utilized in the particular imaging device 12. Albeit of limited use in single camera installations, the present disclosure contemplates connecting multiple cameras in an array, with some possible configurations utilizing almost a dozen cameras. The color identification ring 20 is understood to help the operator distinguish and identify each one in such configurations.

In an exemplary embodiment, an external filter 22 is coupled to the color identification ring 20. The external filter 22 may have various optical characteristics, though in its most basic form, is understood to be an abrasion-resistant coated clear glass. The image capture system 10 is contemplated to be installed in moving vehicles, and so exposure to various abrasive particles is expected. The external filter 22 is envisioned to protect the internal components of the imaging device 12 from such environments during use. Additionally, a neutral density (ND) filter, a linear polarizer (PL) filter, a circular polarizer (CPL) filter, as well as narrow and wide band pass filters may be utilized. The external filter 22 may be threaded on to the color identification ring 20, though this is by way of example only and other attachment modalities such as bayonet style mounts may be substituted.

The imaging device 12 also includes a lens 24 that is positioned in an offset relation to a sensor 26. The lens 24 is mounted a lens mount 25, while the sensor 26 is mounted to a sensor board 28. The lens 24 may be interchangeable with others of differing focal lengths, maximum and/or minimum aperture sizes, and having specifications matched to the sensor 26 in terms of pixel count, sensitivity wavelength range, and so on. Liquid auto-focusing lenses are also possible, with the electronics to control the focus functionality thereof being incorporated into the imaging device 12, as will be described below. The lens 24 may be held within the lens mount 25 with set screws, thumb screws, and the like. In one embodiment, the lens mount 25 may conform to the m12 (male metric m12 thread) standard, also known as the S-mount. Alternatively, the lens mount 25 may conform to the C mount or CS mount standard. Indeed, any other lens of any other mount system may be readily substituted without departing from the present disclosure. Along these lines, the camera top 18 may be sized and configured to accommodate any lens 24/lens mount 25 combination.

The sensor 26, along with the sensor board 28 to which it is mounted, is likewise understood to be interchangeable. In a basic configuration, the sensor 26 is silicon-based (charge coupled device/CCD or complementary metal oxide semiconductor/CMOS), and is therefore understood to be sensitive to wavelengths in the range of 300 nm to 1200 nm. Alternative sensors including mid and long wave infrared sensors, also known as thermal sensors may also be substituted. Some sensors 26 may include Bayer filters, meaning that full color sensing is possible, while those without such filters are understood to be mono/grayscale sensors. The sensors 26 are also available in a wide range of pixel sizes and pixel counts. In one preferred, though optional embodiment, the sensor 26 is a 1.2 megapixel sensor available in either color or grayscale (also referred to as RGB or mono). Alternatively, 3 megapixel sensors and 16 megapixel sensors may also be utilized. The sensor 26 may utilize either a global shutter or a rolling shutter, depending on the particulars of manufacture. Those having ordinary skill in the art will recognize that any suitable sensor 26/lens 24 for a particular application may be utilized.

Interposed between the lens 24 and the sensor 26 is an internal filter 30 that is mounted to a filter holder 32. It is envisioned that the one of the distinguishing features of one imaging device 12 over another utilized in the image capture system 10 is the internal filter 30. With identical lenses 24 and sensors 26, the captured images may be readily stitched and aligned for multi-spectral analyses. The varying parameters of the internal filter 30 are understood to allow the sensor 26 to better capture certain bands of the visible light spectrum. The internal filters 30 may range from broadband characteristics, that is, a wide range of wavelengths are permitted to pass through to the sensor 26, or narrow band, that is, a narrower range of wavelengths are permitted to pass through to the sensor 26. The filter holder 32 is understood to position the internal filter 30 in a centered relationship to the sensor 26, with the internal filter 30, as well as the shelf of the filter holder 32 holding the internal filter 30, being sized slightly larger than the active area of the usable pixels of the sensor 26.

The raw data captured by the sensor 26 is passed to a processor 34 that is disposed on a processor board 36. The processor 34 may be a specialized digital signal processor (DSP) that performs various image processing functions such as Bayer transformation and sharpening, and constructing a data file that may then be saved on to a recordable media. The processor 34 and/or the processor board 36 are also understood to be interchangeable/upgradeable as improved components that are more efficient or more capable become available.

The basic functions of the imaging device 12 may also be controlled by the processor 34, For instance, the processor 34 may receive a signal corresponding to an instruction to trip the shutter and capture data from the sensor 26, and in response, the processor 34 may so command the sensor 26. The focus of the lens 24, which is defined as the distance between the lens 24 and the sensor 26, may be adjustable. Most miniaturized imaging systems do not employ mechanical shutters or adjustable apertures. Instead, the shutter is simulated by activating the sensor elements for a set duration which may be adjustable in certain predefined increments such as ¹⁄₁₀ seconds, ¹⁄₆₀ seconds, ¹⁄₂₅₀ seconds, and so forth. The aperture may be a set size that is defined as a ratio of the focal length such as f/1.4, f/2, f/2.8, and so forth, and incorporated into the lens 24. Sensitivity of the sensor 26, which is defined in terms of ISO numbers may be adjustable. These functions and settings may be activated and modified via the processor 34 based upon external instructions. Those having ordinary skill in the art will recognize that certain shot-to-shot settings such as shutter speed and focus may be automated, with the steps to implement such functionality also being executed by the processor 34. As such, the processor 34 may also be referred to as a controller.

Disposed beneath the sensor board 28 and above the processor board 36 is a heat sink 38. For light weight and desirable heat transfer characteristics, aluminum may be utilized for the heat sink 38. The surface area from which heat is dissipated may be increased with fins around the perimeter of the heat sink 38, and may be exposed to the exterior of the camera housing 16. In this regard, as shown in FIGS. 1, and 2, the camera housing 16 may define a series of slats 40.

Offset from the sensor board 28 is a power board 42, which includes two externally accessible buttons 43—a first button 43a and a second button 43b. There may additionally be externally accessible light emitting diode (LED) indicators (not shown). The buttons 43 accept inputs that invoke the functionality of the imaging device 12, while the LED indicators are understood to provide feedback to the user when such functionality is activated. The LED indicators may illuminate at various rates and with various colors to represent different status messages, alert conditions, and the like. The buttons 43, together with the LED indicators, are understood to define a basic user interface to the imaging device 12. The power board 42 is understood to includes a flexible flat cable (FFC) connector to the extent an autofocus lens is utilized. Additionally, the inertial measurement unit (IMU) that reports camera orientation data, as well as the real time clock (RTC) battery may be disposed on the power board 42.

The imaging device 12 also includes an input/output expansion connectivity board 44 with a link board interface 46 that is used to connect to the imaging array link board 14 so that other devices can access the functionality thereof. In one embodiment, the link board interface 46 is a 40-pin CHAMP expansion connector, though any other suitable connector may be readily substituted without departing from the scope of the present disclosure. The input/output expansion connectivity board 44 also includes a 60-pin bottom expansion board connector 48 by which additional components such as display screens, additional batteries, Global Positioning System receivers, Bluetooth and WiFi communications modules, and so on can be connected to the imaging device 12. While the input/output expansion connectivity board 44 serves as a hub for incoming and outgoing connections to components outside the imaging device 12, there may also be a speaker (not shown) that provides similar alert and status indications as the aforementioned LED indicator.

A communications network between the imaging device 12 as one node thereon and other device nodes may be established with a communications module 56 on the input/output expansion connectivity board 44. The use of a Controller Area Network (CAN) bus of a deployment platform, which in a preferred though optional embodiment, is an unmanned aerial vehicle, is contemplated. In this regard, the communications module 56 is a CAN node transceiver that is controlled by the processor 34. Alternatively, the CAN transceiver, and hence the communications module 56, may be directly implemented in the processor 34. The communications module 56 may thus be encompassed within references to the controller of the imaging device 12. Additional details pertaining to the communications between the imaging device 12 will be described below.

The input/output expansion connectivity board 44 further includes a memory card adapter 52 receptive to an external memory card. The files generated by the processor 34 representative of the images captured by the sensor 26 may be saved on to the memory card, and subsequently transferred to a general purpose computer. The memory card adapter 52 is to be readily accessible by the operator, and so the camera housing 16 further defines a slot 54 for the memory card adapter 52. Preferably, though optionally, the memory card and the memory card adapter conform to the microSD standard, but any other removable memory card may be substituted.

The aforementioned processor board 36, power board 42, and input/output expansion connectivity board 44 are connected to each other with mezzanine connectors. Additional boards may be connected thereto, and remain enclosed within the camera housing 16. These boards may include additional memory, additional input/output ports, additional data storage, and so on.

The configuration of the imaging device 12 described above has been presented by way of example only and not of limitation. Those having ordinary skill in the art will recognize that there are a variety of ways in which an imaging device may be implemented, and the specific functions and segregation of components into different boards is likewise exemplary only, and any desirable integration and manner of integration may be utilized without departing from the scope of the present disclosure.

Figure 5:
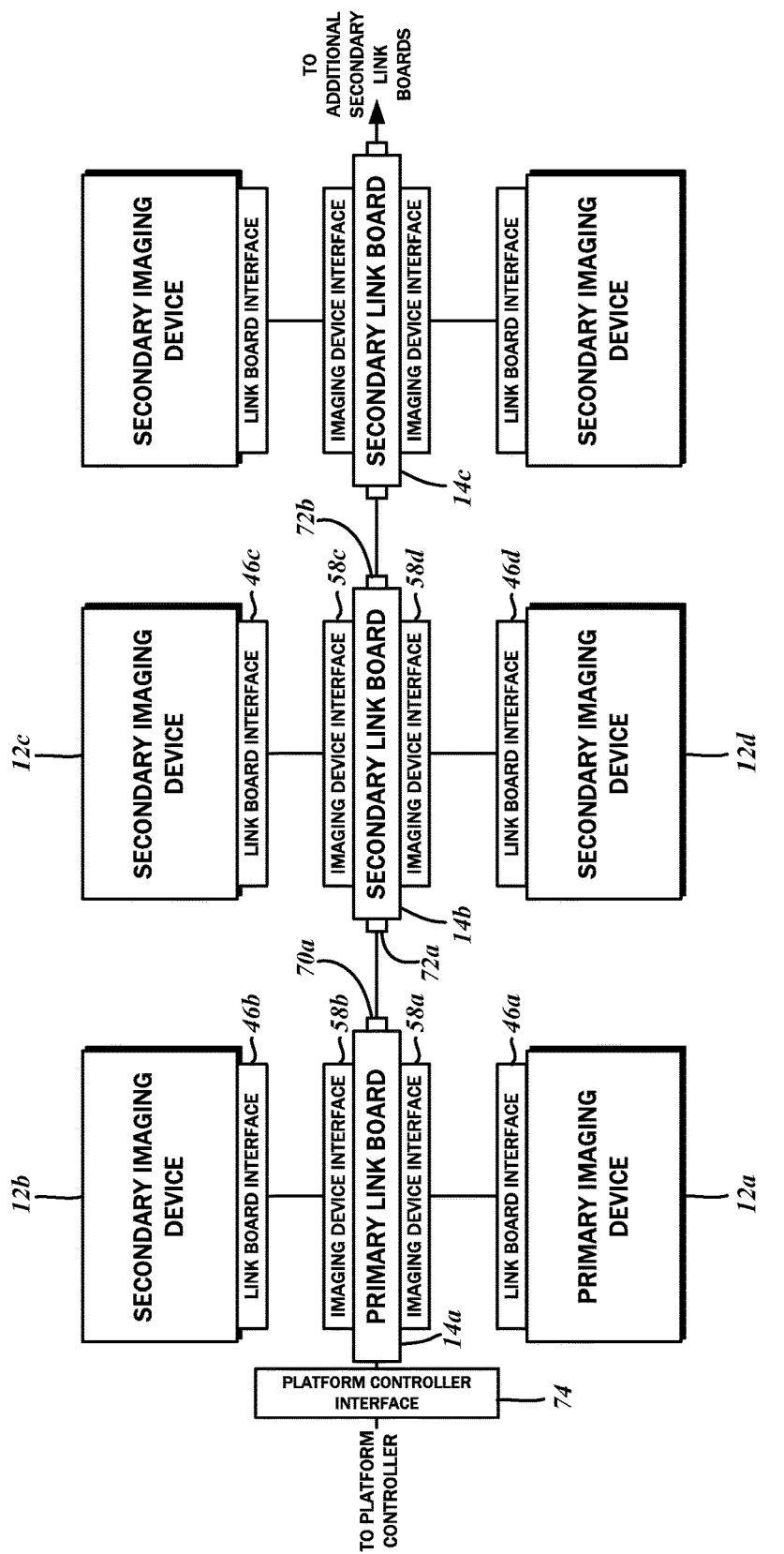
FIG. 5 is a block diagram illustrating the various modular components of the image capture system.

Referring now to the block diagram of FIG. 5, the image capture system 10 includes one or more imaging devices 12 that are functionally linked with one or more imaging array link boards 14. In the illustrated example, the first imaging device 12a and the second imaging device 12b are connected to a first imaging array link board 14a. The first imaging device 12a is designated as the primary or master imaging device because commands issued thereto are replicated across the remaining imaging devices 12 in the network. The second imaging device 12b is designated as the secondary or slave imaging device because it only receives and responds to commands issued by the primary or master imaging device. Because the imaging devices 12 are intended to be interchangeable, any one may serve as a primary/master, and the assignment of a primary/master status or secondary/slave status is defined within each of the controllers of the imaging devices 12, that is, in the executable software instructions implementing the networking procedures of the controllers.

As indicated above, each of the imaging devices 12 includes a link board interface 46. In further detail, the primary or first imaging device 12a includes a first link board interface 46a, while the secondary or second imaging device 12b includes a second link board interface 46b. With additional reference to FIGS. 6 and 7, the imaging array link board 14 includes a corresponding imaging device interface 58, specifically, a first imaging device interface 58a and a second imaging device interface 58b. Continuing with previous example, the link board interface 46 is a 40-pin CHAMP expansion connector, and therefore the imaging device interface 58 to which it connects is likewise a 40-pin CHAMP expansion connector. The imaging device interface 58, i.e., the CHAMP expansion connector that is on the imaging array link board 14, is a plug variant, and the link board interface 46, i.e., the CHAMP expansion connector that is on the imaging device 12, is understood to be a socket variant. Although this configuration is understood to minimize the thickness of the imaging array link board 14, this is by way of example only, and the socket-side and the plug-side may be reversed without departing from the scope of the present disclosure.

An exemplary embodiment of the imaging array link board 14 includes an enclosure 60 defined by a top shell 60a and a bottom shell 60b that mate together. The enclosure 60 has a generally flat, quadrangular shape defined by a first side end 62 and an opposed second side end 64. Furthermore, the enclosure is also defined by a front face 66 and an opposed rear face 68. Each shell 60a, 60b defines a respective opening for the first imaging device interface 58a and second imaging device interface 58b. The first imaging device interface 58a thus extends in a perpendicular relationship to the front face 66, and protrudes from the top shell 60a. Similarly, the second imaging device interface 58b extends in a perpendicular relationship to the rear face 68, and protrudes from the bottom shell 60b. In the exemplary embodiment, the first imaging device interface 58a and the second imaging device interface 58c extend in an axial alignment or in a coplanar relationship to each other. Thus, as shown in FIGS. 1, 2, and 3, when the imaging devices 12 are attached to the imaging array link board 14, they are in vertical alignment, with the optical axis thereof being oriented in the same direction laterally and vertically, though offset by the thickness of the imaging array link board 14.

Referring again to the block diagram of FIG. 5, the first imaging array link board 14a connects to other imaging array link boards, for example, a second imaging array link board 14b, and thus includes a first board downstream interconnect 70a. Therefore, the imaging array link board 14 may also be referred to as an array imaging system expander, as it expands the number of imaging devices that can be functionally linked. The second imaging array link board 14b likewise includes a second board upstream interconnect 72a, which is connectable to the first board downstream interconnect 70a.

The board interconnects 70, 72 may be JAE-DD2 type connectors and different plug, receptacle, and cradle variants may be used. The first board downstream interconnect 70a may be a receptacle type, with the second board upstream interconnect 72a may be a plug type configured to be received within the receptacle. Alternatively, the second board upstream interconnect 72a may be a cradle type, with a separate plug connecting the first board downstream interconnect 70a and the second board upstream interconnect 72a. At a minimum, the board interconnects includes a data transmission line and a power transmission line as will be described in further detail below. Because the same connectors are used, it is understood that the pin layouts are corresponding to the other.

Like the imaging devices 12, where there are multiple imaging array link boards 14, one may be designated a primary or master, while the others in the array are designated a secondary or slave. The first imaging array link board 14a is thus designated the primary/master, and the second imaging array link board 14b is designated the secondary/slave.

The second imaging array link board 14b is similarly configured as the first imaging array link board 14a, though with two secondary imaging devices 12c and 12d. These imaging devices each includes a link board interface 46c, 46d that connect to imaging device interfaces 58c, 58d, respectively. The secondary imaging array link board 14b may be networked with additional secondary imaging array link boards 14c, over a second board downstream interconnect 72b.

Figure 6:
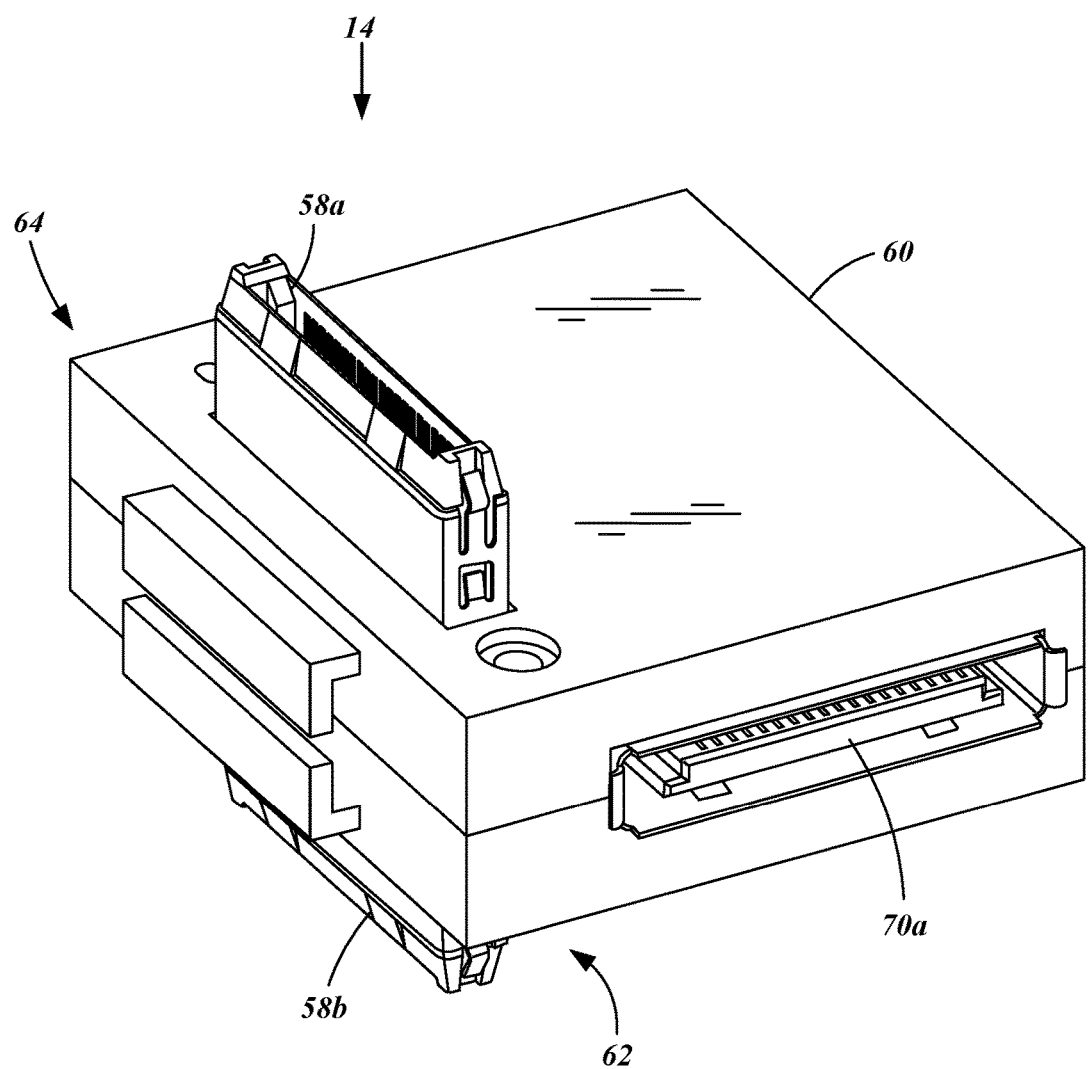
FIG. 6 is a perspective view of an array imaging system expander in accordance with another embodiment of the present disclosure.
Figure 7:
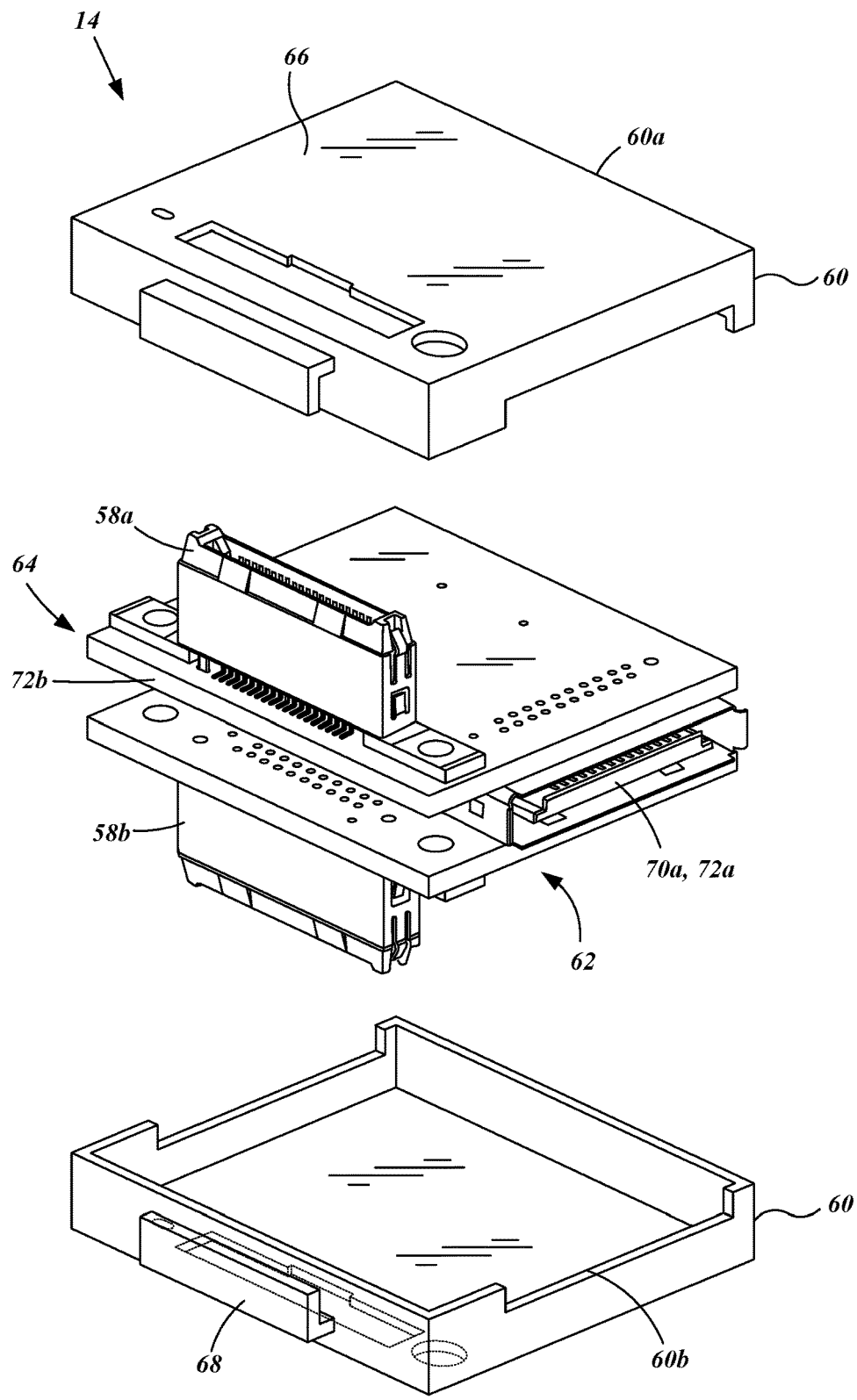
FIG. 7 is an exploded perspective view of the array imaging system expander showing the various components thereof.

As shown in FIG. 6, the first board downstream interconnect 70a is disposed on the first side end 62 of the imaging array link board 14. However, unlike the readily interchangeable imaging devices 12 where the master or slave status is set in software, in some embodiments, the hardware of the primary/master imaging array link board is not identically configured as the secondary/slave imaging array links boards. The first imaging array link board 14a has one board interconnect, e.g., the first board downstream interconnect 70a. It is expressly contemplated that no other upstream imaging array link boards can be connected to the primary/master imaging array link board 14a. The second imaging array link board 14b, on the other hand, may include both an upstream connection to the first imaging array link board 14a as well a downstream connection to the third imaging array link board 14c. In this embodiment, the second board upstream interconnect 72a is disposed on the first side end 62 of the imaging array link board 14, and the second board downstream interconnect 72b is disposed on the opposite second side 64 of the imaging array link board 14.

The first imaging array link board 14a, that is, the primary/master imaging array link board, instead includes a trigger source interface 74, which connects to a trigger source. In the context of unmanned aerial vehicles, the trigger source is understood to be the general flight control system that, in addition to outputs that regulate the movement of the vehicle, includes peripheral outputs that can drive various devices. The flight control system is understood to be connected to or include a wireless transceiver that is receptive to signals corresponding to inputs to a remote controller, such that the vehicle may be remotely piloted, and peripheral devices such as the image capture system 10 can be activated. Alternatively, the trigger source may be an on-board GPS unit connected to the trigger source interface 74. By way of example, such a GPS unit may evaluate the distance traveled by the vehicle, and activate the image capture system 10 when a certain threshold distance has been traversed.

A shutter activation command may be generated by the trigger source, which does so in response to a command input at the remote controller. This command is then passed to the first imaging array link board 14a and to the first imaging device 12a. In response, the first imaging device 12a may initiate the image capture process and activate the sensor 26, and save the captured data on to the onboard memory. Concurrently, the first imaging device 12a may generate a secondary shutter activation command and passes the same to the other image imaging device 12b connected to the first imaging array link board 14a, as well as the third and fourth imaging devices 12c, 12d that are connected to the second imaging array link board 14b. Upon receipt of the secondary shutter activation command, these secondary/slave imaging devices 12b-12d may similarly initiate the image capture process. The shutter activation command may also originate from one of the imaging devices 12 rather than the aforementioned external trigger source. For example, the imaging device 12 itself may evaluate certain conditions such as time, detected patterns in independently captured images, and so on, and trigger the remaining imaging devices 12 in the array based upon the outcome of such evaluations. Although only a shutter activation command is referenced, other definable actions may be initiated, such as commands to change the setting of the imaging device 12, starting and stopping video recording, and so forth.

Instead of the foregoing multi-tier approach to propagate the shutter activation command, it is possible for all of the imaging devices 12 that are part of the array to be activated with a single shutter activation command. In one preferred, though optional embodiment, such a shutter activation command may be a pulse-width modulated signal directly from the trigger source. Any other suitable electronic signaling modality may be substituted for the pulse-width modulated signal, however.

Figure 8:
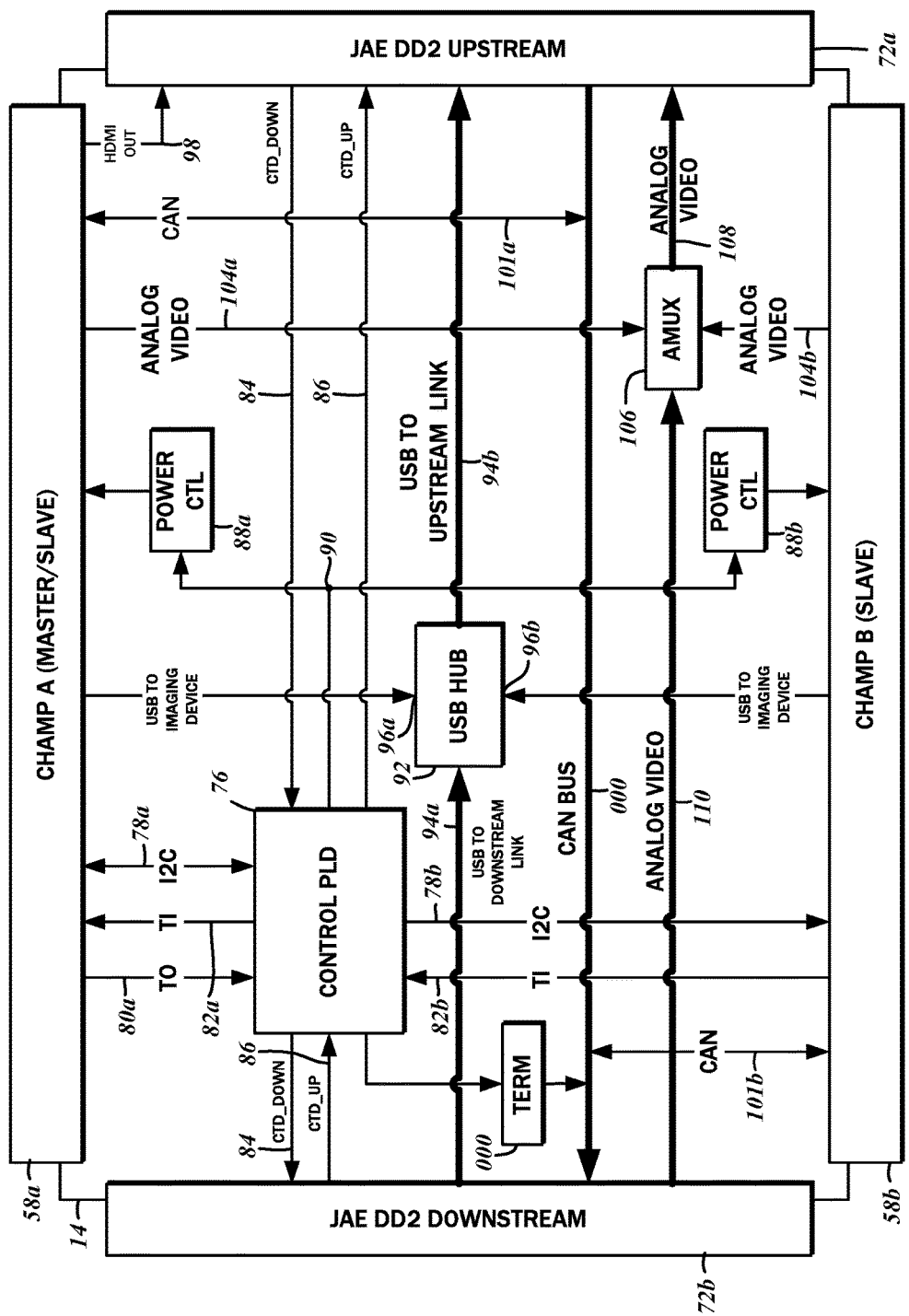
FIG. 8 is a detailed block diagram of an array imaging system expander.

The block diagram of FIG. 8 shows one contemplated embodiment of the imaging array link board 14. As mentioned above, there is a first imaging device interface 58a referred to as a CHAMP connector A, which may be designated as either primary/master or secondary/slave. There is also a second imaging device interface 58b referred to as a CHAMP connector B, and is designated a secondary/slave. The imaging array link board 14 further includes a second board upstream interconnect 72a which is a JAE DD2 type connector and designated as the downstream (relative to another connector upstream), and a second board downstream interconnect 72b which is also a JAE DD2 type connector but designated as the upstream (relative to another connector downstream). Thus, bi-directional serial communications to and from the imaging array link board 14 are possible. In accordance with the illustrated embodiment, multiple digital communications/data transfer modalities may be implemented by the imaging array link board 14, including Universal Serial Bus (USB), CAN, and High Definition Multimedia Interface (HDMI). The transmission of raw analog video signals and power signals are also contemplated.

The functionality of assigning and recognizing unique identifiers for, and designating primary/master and secondary/slave status of, each imaging device 12 and each imaging array link board 14 may be implemented as a series of pre-programmed instructions that are executed by a programmable logic device, e.g., a control PLD 76, which may also be referenced herein as a local data networking host. The control PLD 76 is also understood to implement triggering and various board control functions. The identifier number assigned to each of the imaging array link boards 14 is understood to be determined automatically by the number of imaging array link boards connected together. In one contemplated embodiment, a token can be passed from one to the other in order to enumerate the number of present and active positions. Various commercially available PLD integrated circuits may be utilized, such as the Altera Max10 device or the Lattice ICE40 Ultra device.

The imaging device 12 connected to the first imaging device interface 58a is connected to the control PLD 76 over a first I²C link 78a, and the imaging device 12 connected to the second imaging device interface 58b is connected to the control PLD 76 over a second I²C link 78b. The I²C links 78 are understood to enable each imaging device 12 to read out its unique identifier and role as either a primary/mater or a secondary/slave. The control PLD 76 also includes a trigger output 80 and a first trigger input 82a that are connected the first imaging device interface 58a, along with a second trigger input 82b that is connected to the second imaging device interface 58b. The trigger output 80 is connected to the pulse-width modulated (PWM) signal output, which captured from the primary/master imaging array link board 14a and specifically the primary/master imaging device 12a, and distributed to the secondary/slave imaging array link boards 14b, 14c, and so on. The PWM signal output is distributed to the other imaging array link boards 14 via the CTD_Up line 84 and the CTD_Down line 86, depending on the upstream/downstream direction. As shown, the secondary/slave imaging device 12b connected to the primary/master imaging array link board 14 is driven directly by the second trigger input 82b.

The control PLD 76 is understood to function as a re-driver, thereby removing the effects of digital fan-out and excessive load of the trigger output 80. Additionally, it is possible for the control PLD 76 to adjust the delay of distributing the triggering signals, allowing for synchronous capture across all of the imaging devices 12.

As indicated above, each of the imaging array link boards 14 are understood to be uniquely identified. The assignment of these identifiers may be implemented with the bi-directionally daisy chained CTD_Up line 84 and the CTD_Down line 86. Each control PLD 76 is understood to pass information on to a control PLD 76 on a neighboring imaging array link board 14 through the serial data communications link, and determine its own identifier following power-up. It is contemplated that the control PLD 76 can detect if it is in a primary/master role by not having any upstream connections to a further imaging array link board 14, and if it is in the last position of the daisy chain if there are no further downstream connections. Following assignment of the identifiers, the CTD_Up line 84 and the CTD_Down line 86 are reused for triggering signal distribution lines.

Power to each of the connected imaging devices 12 are delivered via the imaging device interface 58, as discussed above. In order to reduce inrush current into the imaging devices 12, each one is sequentially powered on. Control over power delivery may be provided by a switch circuit 88. The first imaging device interface 58a is connected to the output of a first switch circuit 88a, while the second imaging device interface 58b is connected to the output of a second switch circuit 88b. Each of the switch circuits 88a, 88b is further controlled by a power control line 90 of the control PLD 76.

In accordance with some embodiments of the present disclosure, a USB communications modality may be used to link the imaging array link boards 14. Thus, each may include a USB hub 92 that is connected to a downstream USB link 94a and an upstream USB link 94b. Additionally, the first imaging device interface 58a is connected to a first device port 96a of the USB hub 92, while the second imaging device interface 58b is connected to a second device port 96b. As will be appreciated by those having ordinary skill in the art, USB is a tiered bus that allows addressing and extension via tiered hubs. It is understood that up to 127 devices in 7 tiers can be addressed by a single USB host. The aforementioned local data networking host of the imaging array link board 14 may be implemented as the USB hub 92 in some embodiments. One implementation of the USB hub 92 contemplates the use of a Microchip USB 3803 3-port hub device, though any other suitable device may be substituted.

Due to the configuration restrictions imposed by the USB standard, however, the number of imaging devices 12 and imaging array link boards 14 that may be connected in a single array may be limited. Each extension provided by the imaging array link board 14 is understood to add a USB bus tier, so the maximum number of imaging devices 12 may be limited to twelve, if the primary/master imaging array link board 14 is connected to the root hub. Should there be a further tier of conventional computer peripherals, the maximum number of imaging devices 12 that can be accessed for file transfer may be reduced by on tier. It is expressly contemplated, however, that multiple stacks of the imaging array link board 14 each with multiple imaging devices 12 may be connected through a hub. Furthermore, imaging array link boards 14 with additional capacity may be substituted.

Some imaging devices 12 may be configured to output HDMI signals, and some embodiments of the imaging array link board 14 contemplate connecting to the HDMI signal output of the primary/master imaging device 12a. The first imaging device interface 58a includes an HDMI port 98 that is tied directly to the second board upstream interconnect 72a.

Various embodiments of the imaging array link board 14 also contemplate connecting the CAN bus of the vehicle platform. The imaging array link board includes a pass-through CAN bus line 100 that is connected to both the second board upstream interconnect 72a and the second board downstream interconnect 72b via a first CAN branch connection 101a and a second CAN branch connection 101b, respectively. Additionally, each of the imaging device interfaces 58a, 58b include a connection to the CAN bus line 100. The imaging array link board 14 includes a CAN termination 102 that may be activated and deactivated by the control PLD 76, depending on whether the imaging array link board 14 has been identified as the last one in the chain.

The imaging devices 12 may also output analog video signals, and each imaging device interface 58a, 58b includes a respective analog video output 104a, 104b. There is a video signal multiplexer 106 that selectively directs the signals on the analog video outputs 104a, 104b to an upstream video signal bus 108. Additionally, the second board downstream interconnect 72b is connected to the video signal multiplexer 106 via a downstream video signal bus 110. One implementation contemplates the use of a Dual MAX4310 or MAX4311 device as the video signal multiplexer 106.

Figure 9:
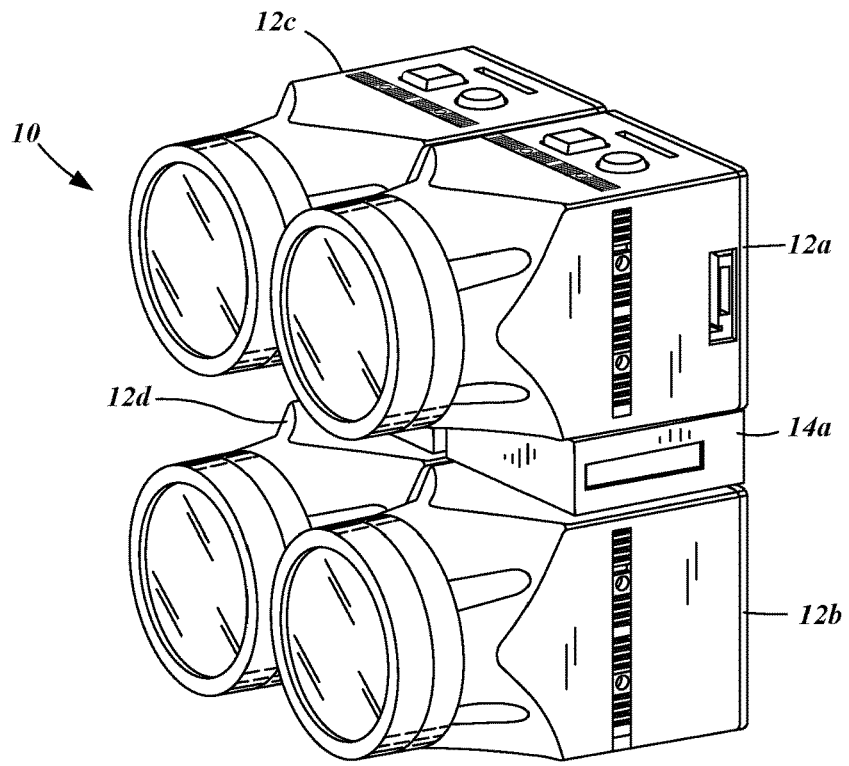
FIG. 9 is a front perspective view of the image capture system in accordance with another embodiment of the present disclosure including two link boards, each with a pair of cameras connected thereto.
Figure 10:
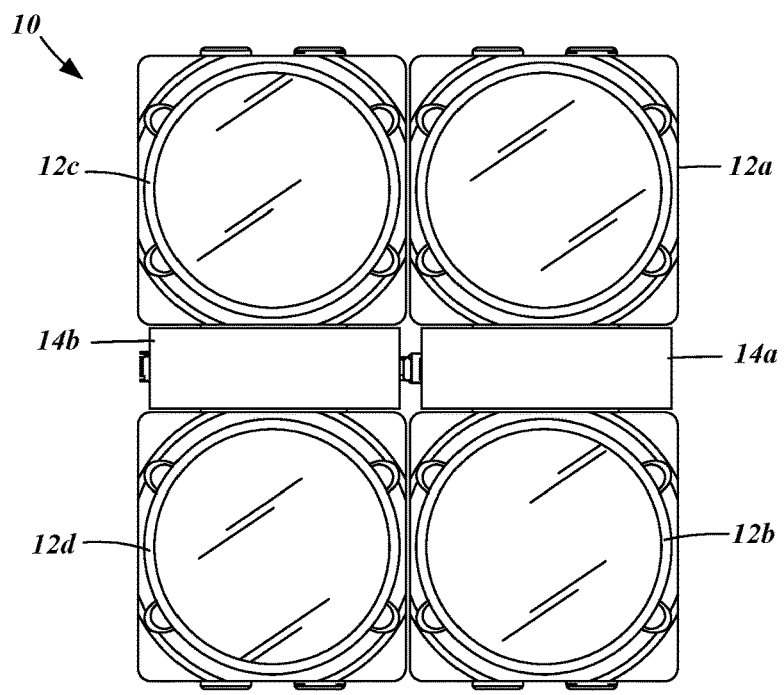
FIG. 10 is a rear perspective view of the image capture system shown in FIG. 9.

As shown in FIGS. 9 and 10, a pair of the first and second imaging devices 12a, 12b linked by the first imaging array link board 14a may be connected to a further pair of third and fourth imaging devices 12c, 12d linked by the second imaging array link board 14b. Thus, an array of imaging devices 12 may be configured, and different imaging devices 12 may be added or removed as needed for a specific application. The array shown in FIGS. 9 and 10, in which the imaging devices 12 are attached to the imaging array link board 14 and being in vertical and/or lateral alignment to each other, is by way of example only.

Figure 11:
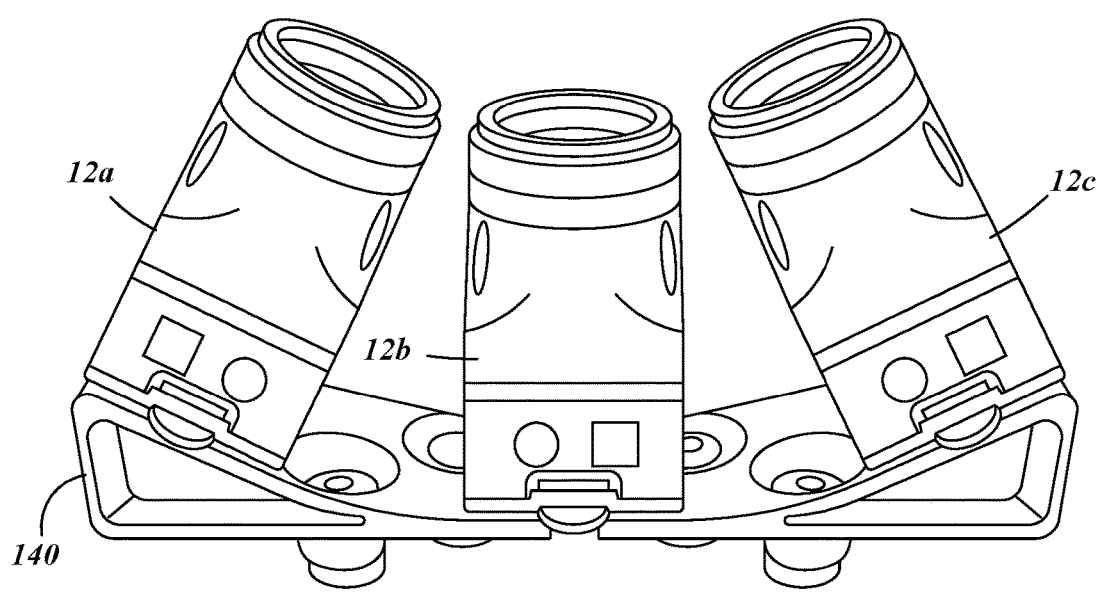
FIG. 11 is a perspective view of an alternative embodiment of the image capture system in which the cameras are mounted in an arcuate configuration.

FIG. 11 illustrates an alternative embodiment with the first imaging device 12a, the second imaging device 12b, and the third imaging device 13b mounted to a curved frame 140. The sensors 26 (as well as the lenses 24) of each of the imaging devices 12a-12c are thus oriented along the curvature of the frame 140, and not along the same plane as each other. With suitable calibration, the images from each imaging device 12 may be combined to capture one image. In such embodiments, it is understood that the imaging array link boards 14 interconnecting the imaging devices 12 are incorporated into the curved frame 140, with the connections between the link boards as well as the connections between the imaging devices 12 being made with flexible cables rather than plugs as described above in the context of the other embodiments.

Figure 12A:
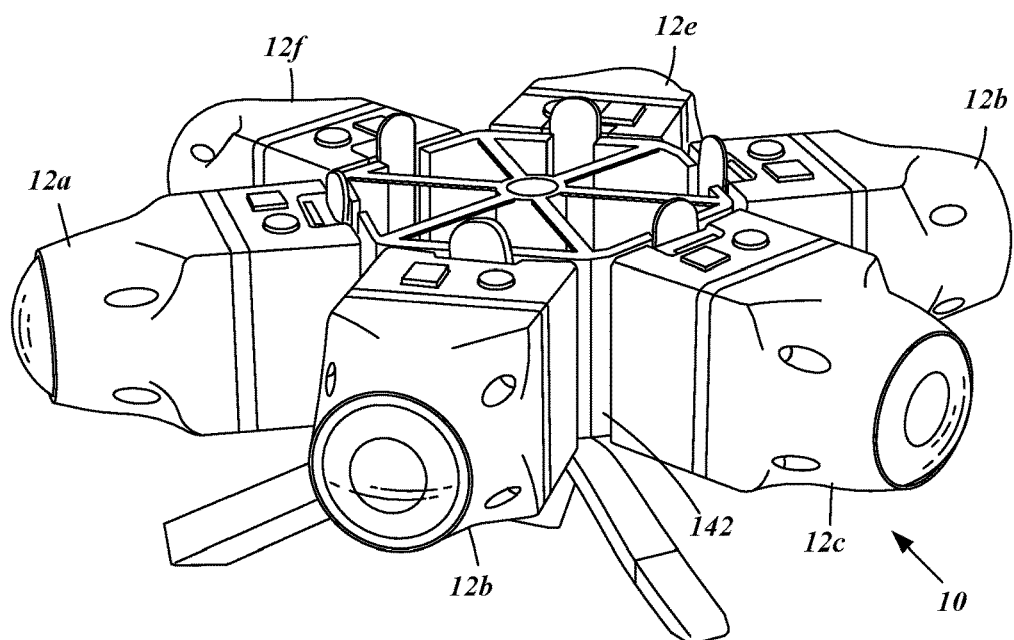
FIG. 12A is a perspective view of yet another embodiment of the image capture system in which the cameras are arranged in a circular configuration for a 360° view.
Figure 12B:
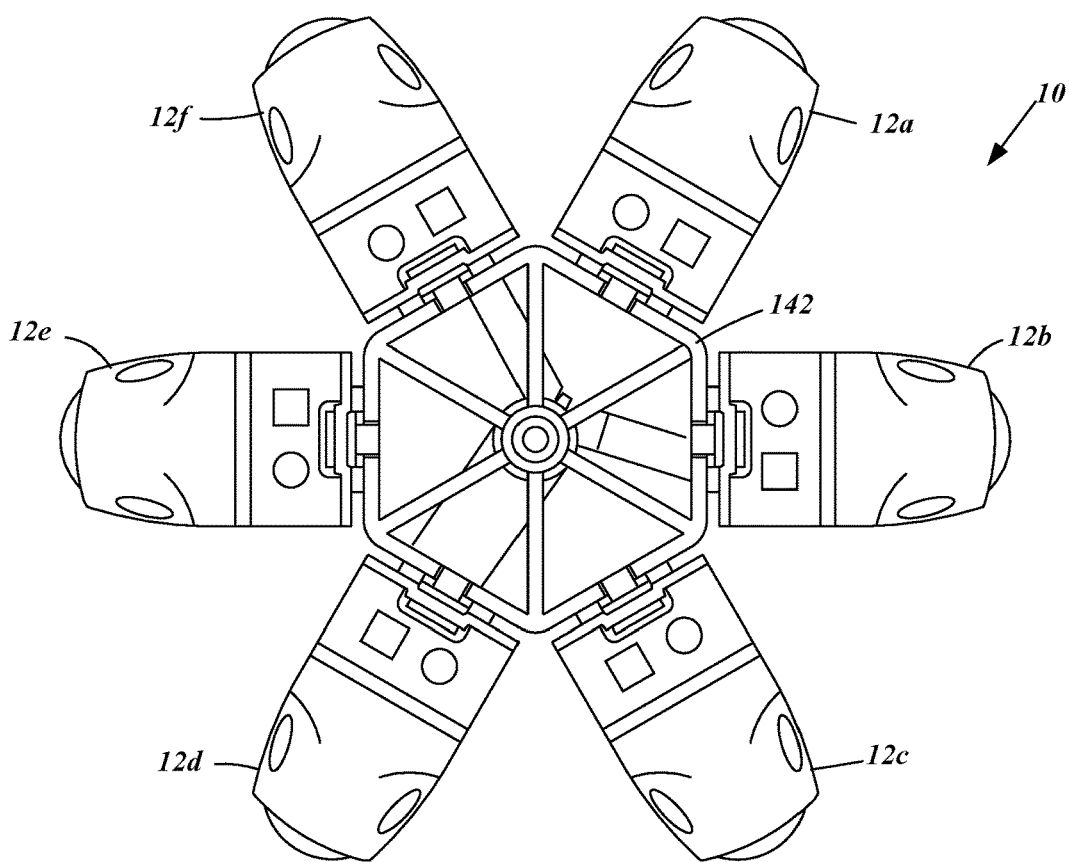
FIG. 12B is a top plan view of the embodiment of the image capture system shown in FIG. 12A.

FIGS. 12A and 12B illustrate still another embodiment that contemplates a circular frame 142, with the imaging devices 12a-12f being mounted on the exterior periphery thereof. The circular frame 142 is more particularly characterized by a hexagonal shape or polygonal with six vertices, each vertex generally corresponding to the dimensions of the camera housing 16. Each vertex is understood to have a height that likewise generally corresponds to the dimensions of the camera housing 16. The view of the imaging devices 12a-12f is understood to be circular, however, and allows the 360° capture of the scene surrounding the image capture system 10. The embodiment shown in FIGS. 12A and 12B incorporate one array level, but multiple levels may be stacked on each other. Those having ordinary skill in the art will appreciate that other physical configuration options in which the imaging devices 12 are oriented in various directions may be readily substituted.

Figure 13A:
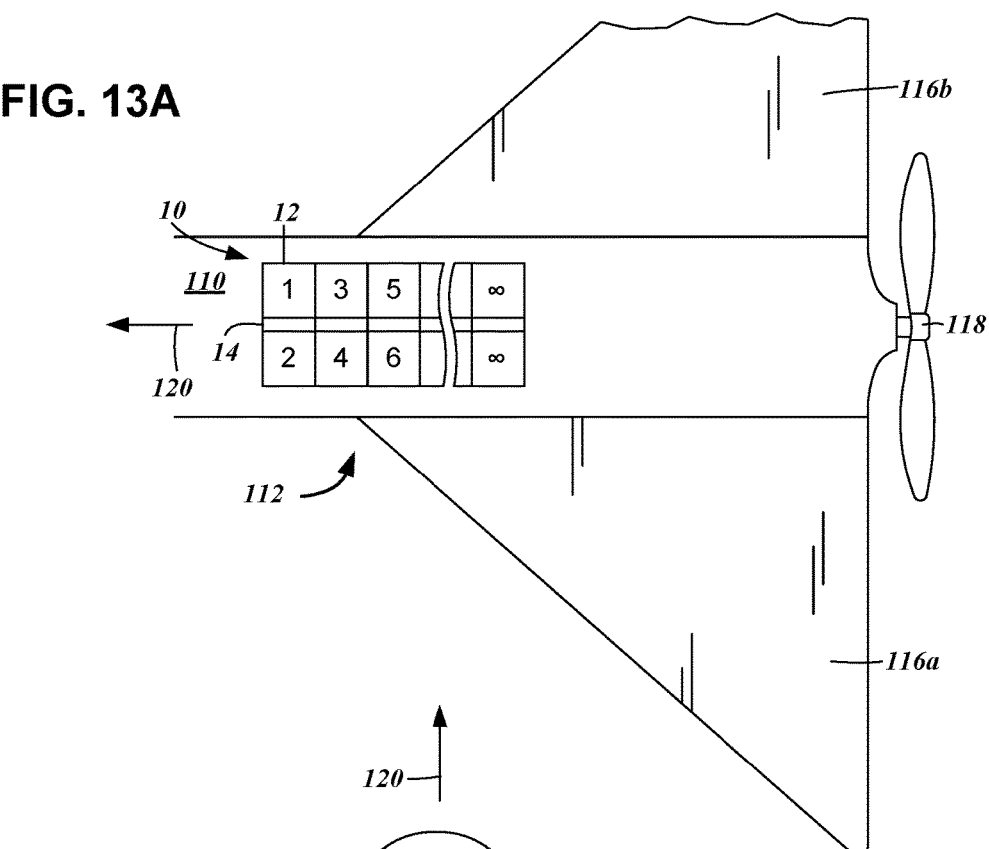
FIGS. 13A, 13B, and 13C illustrate exemplary installations of the image capture system on a fixed wing unmanned aerial vehicle.
Figure 13B:
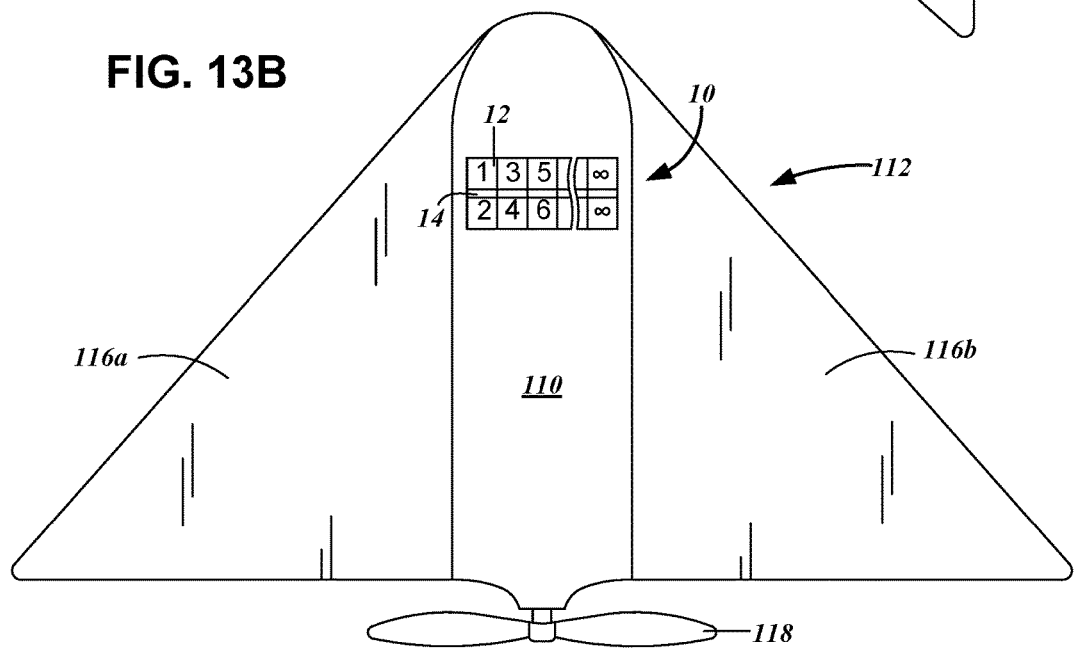
Figure 13C:
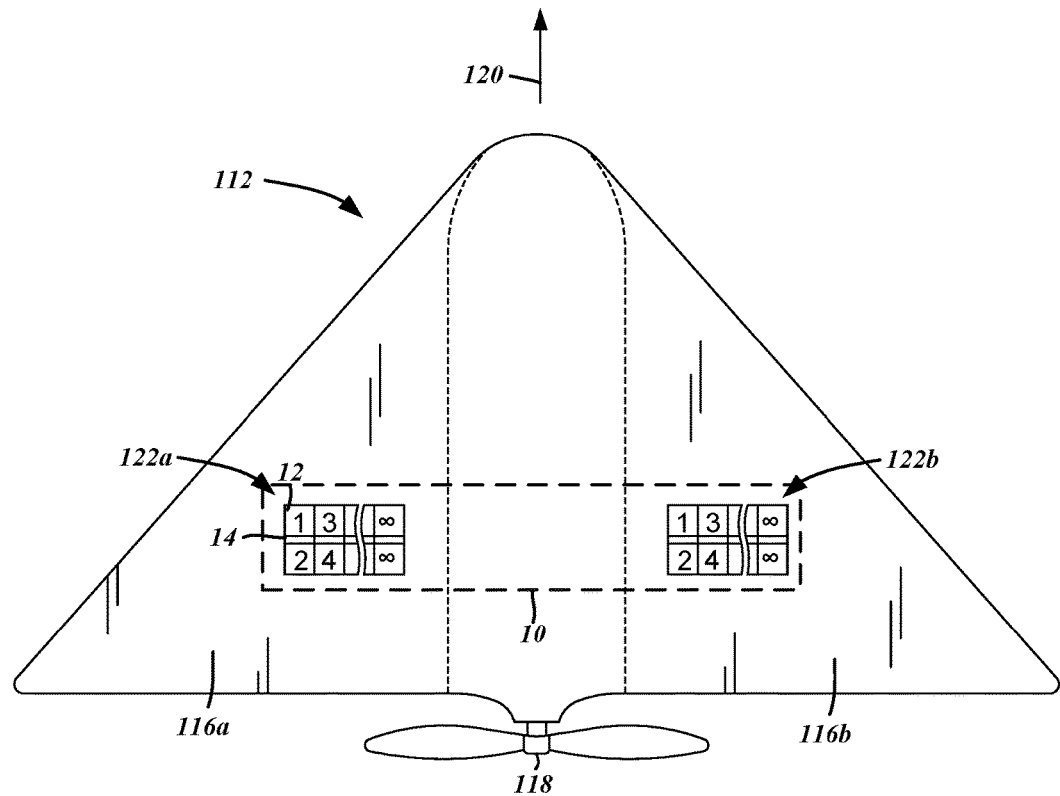

The present disclosure contemplates the installation of the image capture system 10 on unmanned aerial vehicles that can be remotely piloted to a desired location, and capture various imagery thereof. FIGS. 13A-13C show a fixed wing unmanned aerial vehicle 112 generally configured with a fuselage 114 and a pair of wings 116a, 116b, together with a propeller or other propulsion source 118. The image capture system 10 may be mounted to the fuselage 114 such that the imaging device 12 is pointed in a direction perpendicular to the flight path 120 of the fixed wing unmanned aerial vehicle 112 to capture imagery of the ground. Any number of individual imaging devices 12 may be interconnected with the imaging array link board 14. Those having ordinary skill in the art will recognize the suitable mounting modalities for the image capture system 10, and any alternative may be readily substituted without departing from the scope of the present disclosure.

In further detail, the embodiment shown in FIG. 13A illustrates an installation of imaging devices 12 in which the sensor pixel rows of each of the sensors 26 thereof are parallel to the flight path 120. The embodiment shown in FIG. 13B illustrates an installation of the imaging devices 12 in which the sensor pixel rows of each of the sensors 26 thereof are perpendicular to the flight path 120. The embodiment shown in FIG. 13C contemplates the image capture system 10 being split into a first subset 122a and a second subset 122b, which are interconnected with an additional hub. Each of the subsets 122 is understood to include one or more imaging devices 12, as well as one or more imaging array link boards 14. The sensor pixel rows of each of the sensors 26 thereof are understood to be oriented in a perpendicular relationship to the flight path 120.

Figure 14:
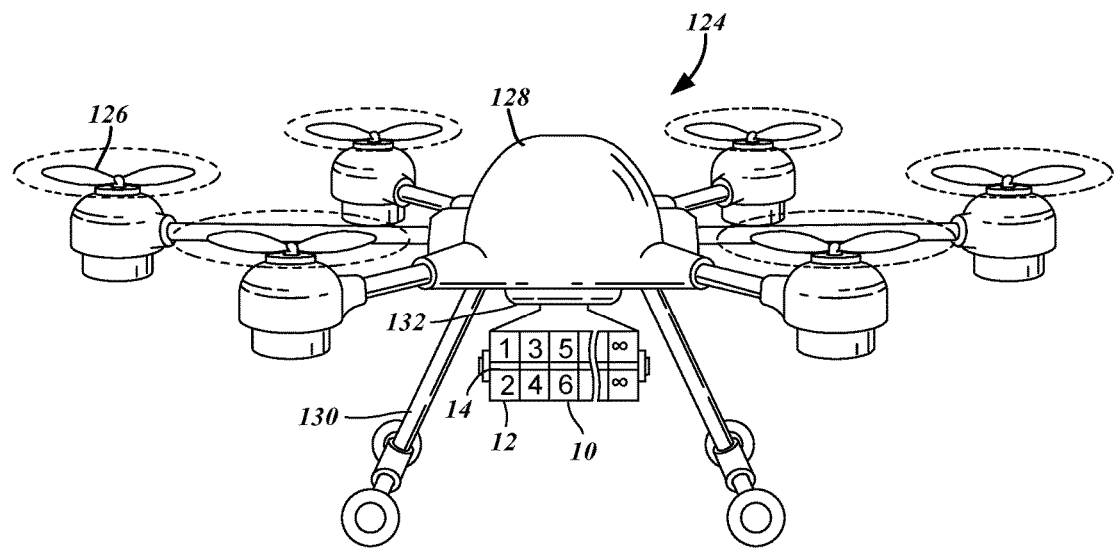
FIG. 14 illustrated an exemplary installation of the image capture system on a rotary wing unmanned aerial vehicle.

FIG. 14 illustrates an embodiment in which the image capture system 10 is installed on a rotary wing unmanned aerial vehicle 124, which is characterized by a plurality of upwardly oriented, counter-rotating rotors 126 that are attached to a body 128 by respective frame arms. Also attached to the body 128 are landing gears 130. The depiction of the rotary wing unmanned aerial vehicle 124 is by way of example only and not of limitation, and any other suitable configuration thereof may be substituted. The image capture system 10 is mounted to the body 128 via a stabilizing gimbal 130. In some embodiments, the gimbal 132 may be motorized and actively respond to vehicle movement to maintain a set orientation during flight. Alternatively, the gimbal 132 may be non-motorized, and use gravity to maintain orientation. By way of example, the individual image capture devices 12 of the system 10 are pointed in a direction parallel to the subject matter, e.g., the surface of the earth), and further, with the sensor pixel elements are oriented perpendicularly to the forward direction of the vehicle 124. The sensor pixel elements may be oriented parallel to the forward direction of the vehicle 124 as well.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present disclosure with more particularity than is necessary, the description taken with the drawings making apparent to those skilled in the art how the several forms of the present invention may be embodied in practice.

What is claimed is:

1. An image capture system controlled by a trigger source, the image capture system comprising:
   one or more imaging devices each including a lens with an optical filter attachable thereto in axial alignment with an optical axis of the lens, a sensor, a link board interface, and a controller in communication with the sensor and connected to the link board interface;
   one or more imaging array link boards separate from the one or more imaging devices and each including a plurality of imaging device interfaces and a first link board interconnect, the link board interface of a first one of the one or more imaging devices being connected to a first one of the plurality of imaging device interfaces of a first one of the one or more imaging array link boards at a first hierarchical level, and the first link board interconnect of the first one of the one or more imaging array link boards being connectible to a link board interconnect of another imaging array link board at a second hierarchical level above the first hierarchical level; and a trigger source interface connected to and in communication with the trigger source and to the first one of the one or more imaging array link boards, a shutter activation command from the trigger source being transmitted to the first one of the one or more imaging devices to initiate an image capture procedure thereby.

2. The image capture system of claim 1, wherein a second one of the one or more imaging devices is connected to a second one of the plurality of imaging devices of the first one of the one or more imaging array link board.

3. The image capture system of claim 2, wherein the second one of the one or more imaging devices initiates another image capture procedure based upon the shutter activation command.

4. The image capture system of claim 3, wherein the shutter activation command is a pulse width modulated (PWM) signal generated by the trigger source.

5. The image capture system of claim 2, wherein the first one of the one or more imaging devices is designated as primary and the second one of the one or more imaging devices is designated as secondary.

6. The image capture system of claim 5, wherein the controller of the first one of the one or more imaging devices generates a secondary shutter activation command to the controller of the second one of the one or more imaging devices in response to receipt of the shutter activation command from the trigger source, another image capture procedure being initiated on the second one of the one or more imaging devices in response to the secondary shutter activation command.

7. The image capture system of claim 2, further comprising:
a local data networking host in communication with each of the controllers of the one or more imaging devices.

8. The image capture system of claim 7, wherein the local data networking host is a Universal Serial Bus (USB) host.

9. The image capture system of claim 2, wherein the first and second one of the one or more imaging devices are both mounted to the first one of the one or more imaging array link boards.

10. The image capture system of claim 9, wherein the first and second one of the one or more imaging devices are both oriented in the same direction.

11. The image capture system of claim 9, wherein the first and second one of the one or more imaging devices are oriented in different directions.

12. The image capture system of claim 11, wherein the first one of the one or more imaging array link boards is designated as primary, and a second one of the one or more imaging array link boards is designated as secondary.

13. The image capture system of claim 11, wherein the second one of the one or more imaging array link boards includes a second link board interconnect.

14. The image capture system of claim 1, wherein each of the one or more imaging devices includes a footprint corresponding to the one or more imaging array link boards.

15. An array imaging system expander, comprising:
a connector board assembly defined by first and second side ends, a front face, and an opposed rear face;
a first board interconnect disposed on the first side end of the connector board assembly and connectible to a corresponding board interconnect of a first array imaging system connector;
a first imaging device interface extending from the front face of the connector board assembly; and
a second imaging device interface extending from the rear face of the connector board assembly opposite the first imaging device interface.

16. The array imaging system connector of claim 15, further comprising:
a second board interconnect disposed on the second end of the connector board assembly and connectible to a corresponding board interconnect of a second array imaging system connector.

17. The array imaging system expander of claim 15, wherein the first board interconnect is a receptacle, and the second board interconnect is a plug, each having pin layouts corresponding to the other.

18. The array imaging system expander of claim 15, further comprising:
a housing at least partially enclosing the connector board assembly, the housing defining openings for the first board interconnect, the first imaging device interface, and the second imaging device interface.

19. The array imaging system expander of claim 15, wherein the first imaging device interface and the second imaging device interface extend outwardly from the respective front and rear faces of the connector board assembly in axial alignment to each other.

20. The array imaging system expander of claim 15, further comprising:
a link controller connected to the first imaging device interface, the second imaging device interface, and the first board interconnect.

21. The array imaging system expander of claim 15, wherein the first imaging device interface, the second imaging device interface, and the first board interconnect each include one or more data transmission lines and a power transmission line.

* * * * *